No. 608,337.  
W. MERKLE.  
BREAD CUTTING KNIFE.  
(Application filed Jan. 21, 1898.)

(No Model.)

Patented Aug. 2, 1898.

Witnesses,

Inventor,  
William Merkle  
By Dewey Strong & Co.  
Attys

UNITED STATES PATENT OFFICE.

WILLIAM MERKLE, OF OAKLAND, CALIFORNIA.

BREAD-CUTTING KNIFE.

SPECIFICATION forming part of Letters Patent No. 608,337, dated August 2, 1898.

Application filed January 21, 1898. Serial No. 667,392. (No model.)

*To all whom it may concern:*

Be it known that I, WILLIAM MERKLE, a citizen of the United States, residing at Oakland, county of Alameda, State of California, have invented an Improvement in Bread-Cutting Knives; and I hereby declare the following to be a full, clear, and exact description of the same.

My invention relates to a device for cutting bread, cake, and like articles.

It consists, essentially, in the combination of a plurality of knives with a handle and a transverse extension-bar and means for adjusting the knives to any desired distance apart and for setting them also at any desired angle with relation to the holding-bar and locking them in position thereto.

It also comprises details of construction which will be more fully explained by reference to the accompanying drawings, in which—

Figure 1:
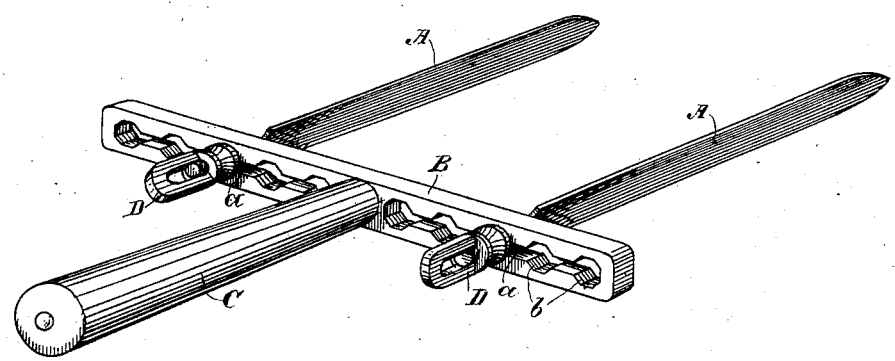
Figure 2:

Figure 1 represents my apparatus. Fig. 2 shows one of the knives detached.

For the purpose of cutting bread and cake in quantities knives have been arranged side by side, connected with a handle, so as to make more than one cut at a time in a vertical direction only.

In cutting the loaves of bread known as "French" bread it is customary to make slanting or diagonal cuts through the loaves, and my device is especially designed to enable this work to be done more rapidly and evenly than at present.

A A are blades, of which there may be any desired number. These blades have shanks, which are made polygonal, as shown at $a$, and exterior to the polygonal part the shanks are of smaller diameter, screw-threaded, and adapted to receive thumb-nuts D.

B is a transverse bar fixed to a handle C, which projects rearwardly from approximately the center of the bar B. The transverse bar B has a series of polygonal openings made in it, as shown at $b$, of such size as to receive the polygonal shanks of the blades A. These openings may be connected by open slots, if desired, so that by loosening the nuts upon the ends of the blade-shanks until the polygonal portion of the shank can be withdrawn from the polygonal socket the smaller screw-threaded part of the shank can be slipped through the narrower portion of the connecting-channel to adjust the knives nearer to or farther from each other without entirely removing the nut from the knife-shank.

By reason of the polygonal shape of the openings the knives may be set either vertical or at an angle with the bar B, so that when the bar is held in an essentially horizontal position these blades, standing parallel with each other, form such an angle with the transverse bar B that the cuts made by the blades will be slanting. This enables the operator to cut the bread in the usual or any desired manner and at the same time to make as many cuts as there are blades at each movement of the apparatus.

Having thus described my invention, what I claim as new, and desire to secure by Letters Patent, is—

1. A device for cutting bread and cake consisting of a plurality of knives having polygonal shanks, a handle, a transverse bar to which the handle is centrally secured, said bar having polygonal openings adapted to receive the shanks of the knives and hold them at any desired angle with relation to the bar, and means whereby the blades are secured to the bar.

2. A device for cutting bread consisting of a transverse bar having a centrally-located handle, polygonal openings made in said bar at either side of the handle with open connecting-slots, a plurality of blades having a portion of the shank made polygonal to fit and lock within the polygonal openings of the bar, and the outer portion of smaller diameter and screw-threaded, and locking-nuts fitting thereon whereby the blades may be locked to the bar at any desired angle and transferred from one polygonal opening to the other by loosening the nuts sufficiently to disengage the polygonal shank from the opening.

3. The combination with a handle-bar having a series of polygonal holes made through it, of knives having polygonal shanks to fit the holes, screw-threaded extensions of smaller diameter projecting behind the bar and nuts by which the knives are adjustably secured to the bar.

In witness whereof I have hereunto set my hand.

WILLIAM MERKLE.

Witnesses:
S. H. NOURSE,
GEO. H. STRONG.